United States Patent [19]

Kroth

[11] 4,076,323

[45] Feb. 28, 1978

[54] FLUID BRAKE SYSTEM FOR A VEHICLE

[75] Inventor: Neil W. Kroth, Joliet, Ill.

[73] Assignee: Caterpillar Tractor Co., Peoria, Ill.

[21] Appl. No.: 795,037

[22] Filed: May 9, 1977

[51] Int. Cl.² ............................................. B60T 13/14
[52] U.S. Cl. ..................................... 303/6 R; 303/10; 303/84 R
[58] Field of Search ....................... 303/2, 6 C, 6 R, 9, 303/10, 11, 13, 52, 84 R, 84 A, 85

[56] References Cited

U.S. PATENT DOCUMENTS

| | | | |
|---|---|---|---|
| 3,395,946 | 8/1968 | Medley et al. | 303/2 |
| 3,423,136 | 1/1969 | Lohbauer | 303/54 |
| 3,498,427 | 3/1970 | Bingley | 192/13 R |
| 3,841,711 | 10/1974 | Stelzer | 303/6 C |

*Primary Examiner*—Duane A. Reger
*Attorney, Agent, or Firm*—Phillips, Moore, Weissenberger, Lempio & Majestic

[57] ABSTRACT

A fluid brake system for a vehicle includes a pair of separate brake valves, each normally held in a non-braking position by pressure applied thereto through an additional valve. The additional valve may be moved to a position wherein such pressure is released from the brake valves, whereupon the brake valves move to braking positions.

6 Claims, 1 Drawing Figure

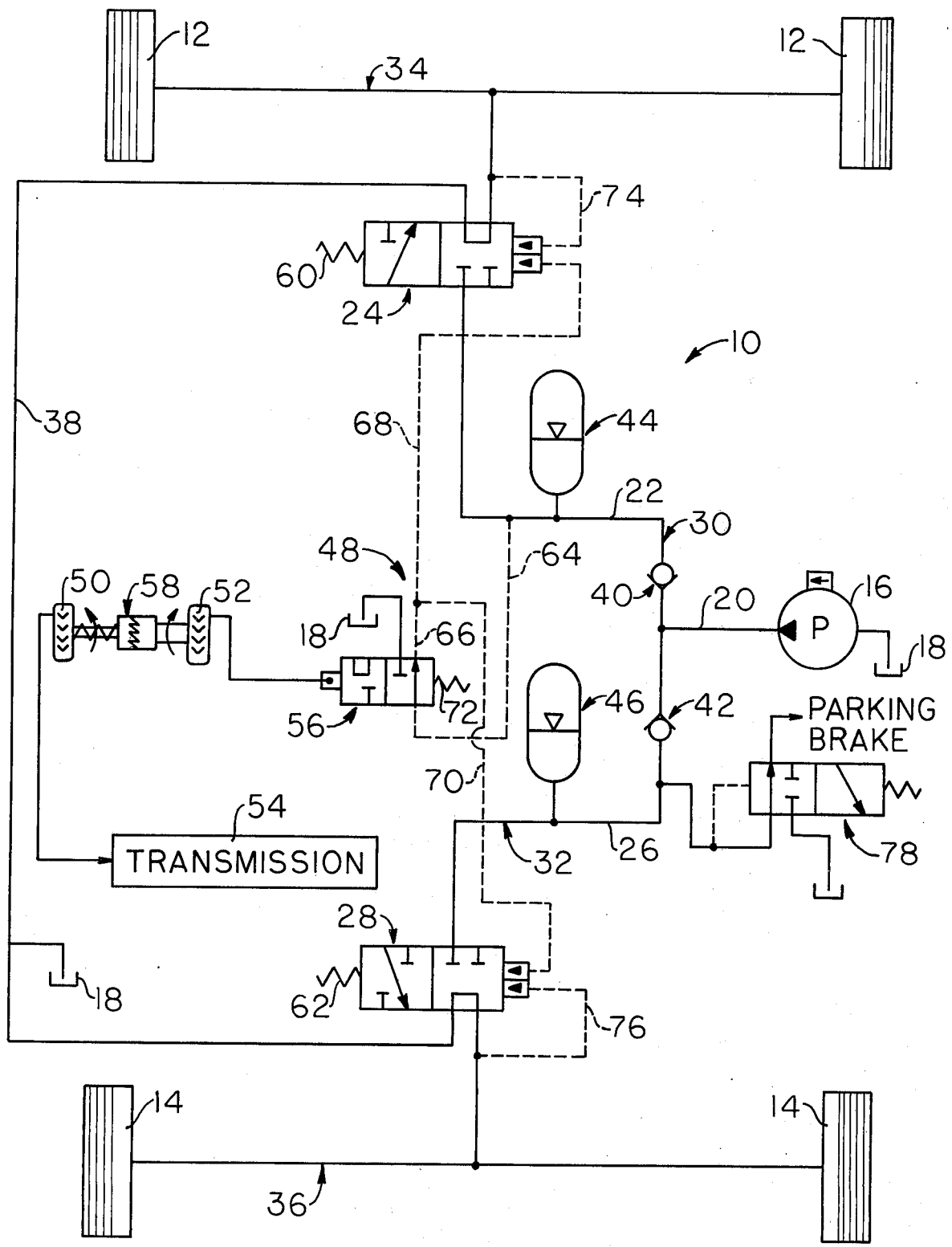

FLUID BRAKE SYSTEM FOR A VEHICLE

BACKGROUND OF THE INVENTION

This invention relates to fluid brake systems for a vehicle, and more particularly, to a system including a pair of brake valves activated by an additional valve.

In a conventional fluid circuit for the braking system of a vehicle, it is well-known to provide a brake valve which is movable to a first position wherein fluid pressure is applied therethrough to the brakes of the vehicle to apply the brakes, the brake valve also being movable to a position wherein such fluid pressure is released from the brakes to release the brakes. In general, such a brake valve is normally biased into a pressure-releasing position, and is movable against such bias to the position thereof wherein fluid pressure is applied to the brakes. Such a system does not safeguard against, for example, a break in a fluid line between the actuator valve and the brake valve, since, upon loss of fluid pressure in such line, the brake valve will be moved under the biasing means associated therewith to a position wherein the brakes are released.

SUMMARY OF THE INVENTION

The present invention is directed to overcoming one or more of the problems as set forth above.

According to the present invention, a fluid circuit for the braking system of a vehicle comprises fluid pump means, and first and second separate brake valves. First conduit means communicate the first brake valve with the fluid pump means. Second conduit means communicate a first brake of the vehicle with the first brake valve. The first brake valve is movable to a position providing communication from the pump means through the first conduit means, the first brake valve, the second conduit means, to the first brake of the vehicle, whereby fluid pressure is applied from the pump means to the first brake, the first brake valve being movable to a position wherein fluid pressure is released therethrough from the first brake. Further included are third conduit means communicating the second brake valve with the fluid pump means, and fourth conduit means communicating a second brake of the vehicle with the second brake valve. The second brake valve is movable to a position providing communication from the pump means through the third conduit means, the second brake valve, the fourth conduit means, to the second brake, whereby fluid pressure from the pump means is applied to the second brake, the second brake valve being movable to a position wherein fluid pressure is released therethrough from the second brake. Further included is an additional valve. Fifth conduit means communicate the additional valve with the fluid pump means, and sixth conduit means communicate the additional valve with the first brake valve. Seventh conduit means communicate the additional valve with the second brake valve. The additional valve is movable to a position providing communication from the pump means through the fifth conduit means, the additional valve, the sixth conduit means to the first brake valve to determine a position of the first brake valve whereby fluid pressure is released from the first brake valve, the movement of the additional valve providing communication from the pump means through the fifth conduit means, the additional valve, the seventh conduit means to the second brake valve to determine a position of the second brake valve whereby fluid pressure is released from the second brake. The additional valve is movable to a position wherein fluid pressure is released from the first and second brake valves through the sixth and seventh conduit means respectively, to provide movement of the first and second brake valves to their respective positions providing application of fluid pressure from the pump means to the first and second brakes.

BRIEF DESCRIPTION OF THE DRAWINGS

Other objects of the invention will become apparent from a study of the following specification and drawing, which is a schematic view of the present fluid brake systems.

DESCRIPTION OF THE PREFERRED EMBODIMENT

Shown in the drawing is the present fluid circuit 10 for the braking system of a vehicle. The vehicle includes front wheels 12 and rear wheels 14. A single pressure compensated variable fluid pump 16 draws hydraulic fluid from the reservoir 18. A main conduit 20 communicates with the outlet of the pump 16. A first branch conduit 22 provides communication between the main conduit 20 and a first brake valve 24 and a second branch conduit 26 provides communication between the main conduit 20 and a second brake valve 28. Each brake valve 24, 28 is of the type generally disclosed in U.S. Pat. No. 3,423,136 to Lohbauer, issued Jan. 21, 1969 (assigned to the assignee of this invention). The main line 20 and branch conduit 22 make up conduit means 30 communicating the pump 16 with the brake valve 24 while the main conduit 20 and branch conduit 26 make up conduit means 32 communicating the pump 16 with the brake valve 28.

Conduit means 34 are also included communicating the front brakes on the vehicle with the brake valve 24. Conduit means 36 are similarly included, communicating the rear brakes of the vehicle with the brake valve 28. The brakes are of the well-known type wherein they are applied upon application of fluid pressure thereto through the conduit means 34 and conduit means 36, and are released upon release of fluid pressure therefrom from the conduit means 34 and conduit means 36.

A conduit 38 interconnects the brake valve 24 and brake valve 28 as shown, communicating with reservoir 18.

Positioned in the branch conduit 22 is a check valve 40 which allows fluid from the pump 16 to the brake valve 24, but which blocks fluid from the brake valve 24 towards the pump 16 as will be further described. Also included is a check valve 42 in the branch conduit 26 which allows fluid flow from the pump 16 to the brake valve 28, but which blocks fluid flow from the brake valve 28 toward the pump 16. An accumulator 44 operatively communicates with the branch conduit 22, and an accumulator 46 operatively communicates with the branch conduit 26. The check valve 40 is positioned in the branch conduit 22 upstream of the accumulator 44, relative to fluid flow in the branch conduit 22 provided by the pump 16. Likewise, the check valve 42 is positioned in the branch conduit 26 upstream of the accumulator 46 relative to fluid flow in the branch conduit 26 provided by the pump 16.

A fluid actuating system 48 is provided for moving the brake valves 24, 28 to appropriate positions, as will be further described. Such system includes first and second operator pedals 50, 52. The pedal 50 is operatively connected with the transmission 54 of the vehicle, and the pedal 52 is operatively connected with an additional valve 56 of the system. The pedals 50, 52 are connected by ratchet apparatus 58 such that if the pedal 52 is depressed, ratcheting between in ratchet apparatus 58 takes place so that the pedal 50 is not actuated. The movement of such single pedal 52 provides actuation of the additional valve 56.

However, if the pedal 50 is depressed to vent the transmission 54, pedal 52 moves therewith so that the additional valve 56 is actuated.

The brake valve 24 is biased rightward by a spring 60 so as to be biased into a position wherein communication is provided therethrough between branch conduit 22 and conduit means 34, so that fluid pressure in branch conduit 22 acts in conduit means 34 to apply the front brakes. Likewise, the brake valve 28 is biased rightward by a spring 62 so as to be biased into a position wherein communication is provided therethrough between branch conduit 26 and conduit means 36, so that pressure buildup in branch conduit 26 is directed therethrough to conduit means 36 to apply the rear brakes.

A conduit 64 communicates the branch conduit 22 and additional valve 56. A conduit 66 leads from the additional valve, and communicates with respective conduits 68, 70 in turn operatively associated with the brake valves 24, 28. Application of fluid pressure in the conduit 68 moves the brake valve 24 leftwardly against the bias of the spring 60 to the position shown, wherein any pressure tending to actuate the front brakes is vented therethrough to conduit 38 and tank 18. Likewise, fluid pressure in conduit 70 tends to move the brake valve 28 leftward against the bias of the spring 62 to the position shown in the drawing, wherein any pressure tending to actuate the rear brakes is vented from the conduit means 36 through the brake valve 28, through conduit 38 to tank 18.

The additional valve 56 is shown in its leftward position, biased into such position by spring 72, wherein fluid pressure is normally indeed applied therethrough from conduit 64, through conduit 66, through conduits 68, 70 to hold the brake valves 24, 28 in their leftward positions as shown. Upon actuation of the pedal 52, the additional brake valve 56 is moved rightward, relieving pressure in conduits 68, 70 from the right sides of the respective brake valves 24, 28, through the conduits 68, 70, 66, through the additional valve 56 and to tank 18. Meanwhile, fluid pressure in conduit 64 is blocked from passing through additional valve 56.

Upon release of fluid pressure in conduit 68 and conduit 70, the brake valves 24, 28 are allowed to move rightwardly, wherein fluid pressure is applied from the pump 16 through the main conduit 20, the branch conduits 22, 26, past the check valves 40, 42, and through the respective brake valves 24, 28 to the conduit means 34 and conduit means 36, applying the front and rear brakes of the vehicle. An additional conduit 74 communicates the conduit means 34 and the brake valve 24, to limit the maximum amount of pressure which can be applied in the conduit means 34 to apply the front brakes. Likewise, an additional conduit 76 communicates the conduit means 36 and the brake valve 28 to limit the maximum amount of pressure which can be applied in the conduit means 36 to apply the brakes.

Upon lifting of the pedal 52, the additional valve 56 moves back to the position shown, wherein fluid pressure is again applied through the conduits 68, 70 to the brake valves 24, 28 moving the brake valves 24 28 leftwardly against the bias of the springs 60, 62. The brake valves 24, 28 are thereby moved to positions wherein fluid pressure is released from the front and rear brakes of the vehicle, through the paths described above.

A parking brake valving apparatus 78 is included as shown.

It will be seen that with either brake valve 24, 28 in either position under normal circumstances, the accumulators 44, 46 have pressure applied thereto, so that pressure is built up therein. In fact, such accumulator pressures act in addition to the pressures supplied by the pump 16 to actuate the front and rear brakes under normal circumstances.

It should also be understood that operation of the brake valves 24, 28 can be staged in such a manner to vary the extent of application of the front and rear brakes in relation to each other as desirable.

It will be seen that the present system operates in a positive manner, i.e., in a vehicle non-braking condition the pump 16 supplied fluid pressure through an additional valve 56 to hold the brake valves 24, 28 in pressure releasing positions, resulting in the brakes not being applied. Upon a loss of pressure in the system supplying pressure to the addition valve 56, the brake valves 24, 28 will move rightward under the bias of the springs 60, 62 associated therewith, directing fluid pressure from the pump 16 through the brake valves 24, 28 and to the front and rear brakes of the vehicle so that the front and rear brakes of the vehicle are applied. Additionally, if a line break occurs between the check valve 40 and the front brake valve 24, the rear brakes of the vehicle will automatically be applied. Furthermore, if a line break occurs between the check valve 42 and the rear brakes, the front brakes remain operable.

The embodiments of the invention in which an exclusive property or privilege is claimed are defined as follows:

1. A fluid circuit for the braking system of a vehicle comprising:
   fluid pump means;
   first and second separate brake valves;
   first conduit means communicating the first brake valve with the fluid pump means;
   second conduit means communicating a first brake of the vehicle with the first brake valve;
   the first brake valve being movable to a position providing communication from the pump means through the first conduit means, the first brake valve, the second conduit means, to the first brake of the vehicle, whereby fluid pressure is applied from the pump means to the first brake, the first brake valve being movable to a position wherein fluid pressure is released therethrough from the first brake;
   third conduit means communicating the second brake valve with the fluid pump means;
   fourth conduit means communicating a second brake of the vehicle with the second brake valve;
   the second brake valve being movable to a position providing communication from the pump means through the third conduit means, the second brake valve, the fourth conduit means, to the second brake, whereby fluid pressure from the pump means is applied to the second brake, the second brake valve being movable to a position wherein fluid pressure is released therethrough from the second brake;

an additional valve;

fifth conduit means communicating the additional valve with the fluid pump means;

sixth conduit means communicating the additional valve with the first brake valve;

seventh conduit means communicating the additional valve with the second brake valve;

the additional valve being movable to a position providing communication from the pump means through the fifth conduit means, the additional valve, the sixth conduit means to the first brake valve to determine a position of the first brake valve whereby fluid pressure is released from the first brake, said movement of the additional valve providing communication from the pump means through the fifth conduit means, the additional valve, the seventh conduit means to the second brake valve to determine a position of the second brake valve, whereby fluid pressure is released from the second brake;

the additional valve being movable to a position wherein fluid pressure is released from the first and second brake valves through the sixth and seventh conduit means respectively, to provide movement of the first and second brake valves to their respective positions providing application of fluid pressure from the pump means to the first and second brakes.

2. The apparatus of claim 1 and further comprising first and second accumulator means operatively communicating with the first and third conduit means.

3. The apparatus of claim 1 and further comprising first and second check valves in the first and third conduit means respectively, the first check valve allowing fluid flow from the pump means to the first brake valve, but blocking fluid flow from the first brake valve toward the pump means, the second check valve allowing fluid flow from the pump means to the second brake valve, but blocking fluid flow from the second brake valve toward the pump means.

4. The apparatus of claim 3 wherein the first check valve is positioned in the first conduit means upstream of the first accumulator, relative to fluid flow in the first conduit means provided by the pump means, and wherein the second check valve is positioned in the third conduit means upstream of the second accumulator, relative to fluid flow in the third conduit means provided by the pump means.

5. The apparatus of claim 1 wherein the first and second brakes of the vehicle are applied upon application of fluid pressure thereto, and released upon release of fluid pressure therefrom.

6. The apparatus of claim 4 wherein the first and second brakes of the vehicle are applied upon application of fluid pressure thereto, and released upon release of fluid pressure therefrom.

* * * * *